United States Patent
Bjerke et al.

(10) Patent No.: US 10,036,412 B2
(45) Date of Patent: Jul. 31, 2018

(54) COUNTERBORE PLUG

(71) Applicant: Caterpillar Inc., Peoria, IL (US)

(72) Inventors: Nathan Bjerke, Peoria, IL (US); Thomas Marshall Congdon, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/264,413

(22) Filed: Sep. 13, 2016

(65) Prior Publication Data

US 2018/0073543 A1     Mar. 15, 2018

(51) Int. Cl.
| | |
|---|---|
| *E02F 9/28* | (2006.01) |
| *F16B 33/00* | (2006.01) |
| *F16B 37/00* | (2006.01) |
| *F16B 37/14* | (2006.01) |

(52) U.S. Cl.
CPC .......... *F16B 33/004* (2013.01); *E02F 9/2816* (2013.01); *F16B 37/14* (2013.01)

(58) Field of Classification Search
CPC .. B62J 23/00; B29C 41/01; B29D 1/00; E01F 9/681; F16B 37/14; F16B 33/004; E02F 9/2816
USPC ............ 37/446, 451–461; 403/375; 411/431, 411/377, 429, 373
See application file for complete search history.

(56) References Cited

U.S. PATENT DOCUMENTS

| | | | | |
|---|---|---|---|---|
| 2,551,834 A | * | 5/1951 | Ferguson ................ | B29C 41/14 138/96 T |
| 2,632,479 A | * | 3/1953 | Pfeil ...................... | B65D 59/00 138/96 T |
| 3,851,413 A | | 12/1974 | Lukavich | |
| 4,907,929 A | * | 3/1990 | Johnston, Jr. ........... | F16B 37/14 411/377 |
| 5,098,239 A | * | 3/1992 | Thiel ...................... | F16B 37/14 411/377 |
| 5,350,266 A | * | 9/1994 | Espey ...................... | B62J 23/00 403/375 |
| 5,752,795 A | * | 5/1998 | D'Adamo ............... | F16B 37/14 411/373 |
| 5,956,874 A | | 9/1999 | Ianello et al. | |
| 6,009,644 A | | 1/2000 | Hedley | |

(Continued)

FOREIGN PATENT DOCUMENTS

| | | |
|---|---|---|
| CN | 101821458 B | 10/2012 |
| WO | 2004029371 | 4/2004 |
| WO | 2015054741 A1 | 4/2015 |

OTHER PUBLICATIONS

Keech, "Wearpact", webpage:http://keech.com.au/products-services/ppatented-systems/wearpact/, available since 2015, published in Australia.

*Primary Examiner* — Robert E Pezzuto
(74) *Attorney, Agent, or Firm* — Law Office of Kurt J. Fugman LLC

(57) ABSTRACT

A counterbore plug comprises a generally cylindrical annular body defining: a cylindrical axis and a radial direction, a first end and a second end that are disposed along the cylindrical axis, an aperture that extends at least partially from the first end to the second end, the body including a radially inner annular surface, a radially outer annular surface, and a plurality of projections that extend radially from the radially inner annular surface that at least partially define a polygonal perimeter.

17 Claims, 4 Drawing Sheets

(56) References Cited

U.S. PATENT DOCUMENTS

| | | | | |
|---|---|---|---|---|
| 6,053,681 | A | * | 4/2000 | Mattershead ........... F16B 37/14 411/14 |
| 6,142,579 | A | * | 11/2000 | Thiel ..................... B60B 7/00 301/108.4 |
| 6,158,933 | A | * | 12/2000 | Nicholson ............... F16B 37/14 116/200 |
| 6,238,158 | B1 | * | 5/2001 | Clements ................ F16B 37/14 411/372.6 |
| 6,305,627 | B1 | * | 10/2001 | Stiner .................. A01K 89/006 24/113 MP |
| 6,595,597 | B2 | * | 7/2003 | Marczynski .......... F16B 1/0071 116/212 |
| 7,793,444 | B2 | | 9/2010 | Jones et al. |
| 8,281,505 | B2 | | 10/2012 | Karlsson |
| 8,458,931 | B2 | * | 6/2013 | Knight .................. E02F 9/2825 37/456 |
| 8,931,190 | B2 | * | 1/2015 | Knight .................. E02F 3/3686 37/455 |
| 9,139,984 | B2 | | 9/2015 | Chenoweth et al. |
| 2007/0212190 | A1 | | 9/2007 | Monday et al. |
| 2012/0260540 | A1 | | 10/2012 | Guimaraes et al. |
| 2014/0186105 | A1 | | 7/2014 | Martinelli et al. |
| 2016/0047110 | A1 | | 2/2016 | Hand et al. |

\* cited by examiner

COUNTERBORE PLUG

TECHNICAL FIELD

The present disclosure relates to work tools such as excavating buckets and the like that have components such as wear members attached to their working edges. More specifically, the present disclosure relates to devices such as plugs and the like that are used to prevent dirt and debris from filling counterbores that surround bores that receive bolts and other fastening members to attached wear members to work tools such as excavating buckets.

BACKGROUND

Work tools such as excavating buckets, shears, rake, etc. are commonly used by equipment and machinery in the construction and mining industries. These work tools such as excavating buckets have working edges that may contact work materials such as rock, stone, dirt, etc. that may cause the working edges to wear down over time, necessitating replacement of the working edge. For some work tools, this working edge may take the form of a base edge that forms part of the front lip of the bucket and that may be attached and detached using various methods such as welding, mechanical fastening systems. These base edges may themselves be protected by attaching wear members onto the base edge, covering the edge and protecting it from the wear caused by work material due to repeated motion and contact with the work material. The wear members may take on various forms including lip shrouds, tool adapters, tools, etc.

Some wear members and other types of ground engaging tools are attached to the work tool such as a bucket using fasteners such as bolts that extend through bores located in the wear member and work tool. A counterbore is often present that surrounds a bore that receives the shaft of the bolt, allowing the threaded end of the bolt to extend through the work tool and the wear member such that its head engages one side of the work tool and wear member assembly and a nut, threaded onto the threaded free end, engages the other side of the work tool and wear member assembly, holding the components together. The counterbore is often oversized compared to the nut, allowing a socket wrench to be used for tightening and loosening the nut.

As can be imagined, dirt and debris may collect in the counterbore as the work tool is used. Eventually, the wear member needs to be replaced either with a new wear member of the same type or another type of wear member or tool. Access to the counterbore is needed to loosen the nut necessitating that the counterbore be cleaned out. Cleaning the debris out of the counterbore may be difficult and time consuming due to the length of time between maintenance intervals. During this time, this matter may become compressed, hardened, etc. in the counterbore.

One prior solution to this problem is proposed by WO 2015/054741 A1 to Keech et al. The dirt plug in this publication comprises a cylindrical member that defines a blind aperture closed off by a top wall. The dirt plug is shown in the figures of Keech et al. to be inserted over cap screw, preventing dirt from collecting in the hexagonally shaped socket of the cap screw. However, this solution suffers from various problems. For example, the top wall is proud of the surrounding structure once installed, making it prone to be damage. Also, there is no suitable way to remove the dirt plug effectively without risking tearing of the dirt plug. Accordingly, a better solution is warranted.

SUMMARY OF THE DISCLOSURE

A counterbore plug is provided. The plug comprises a generally cylindrical annular body defining: a cylindrical axis and a radial direction, a first end and a second end that are disposed along the cylindrical axis, an aperture that extends at least partially from the first end to the second end, the body including a radially inner annular surface, a radially outer annular surface, and a plurality of projections that extend radially from the radially inner annular surface that at least partially define a polygonal perimeter.

A counterbore plug according to another embodiment is provided. The plug comprises a generally cylindrical annular body defining: a cylindrical axis and a radial direction, a first end and a second end that are disposed along the cylindrical axis, an aperture that extends at least partially from the first end to the second end; the body including a radially inner annular surface, a radially outer annular surface; and a plurality of pads that extend radially from the radially outer annular surface.

DETAILED DESCRIPTION

Figure 1:
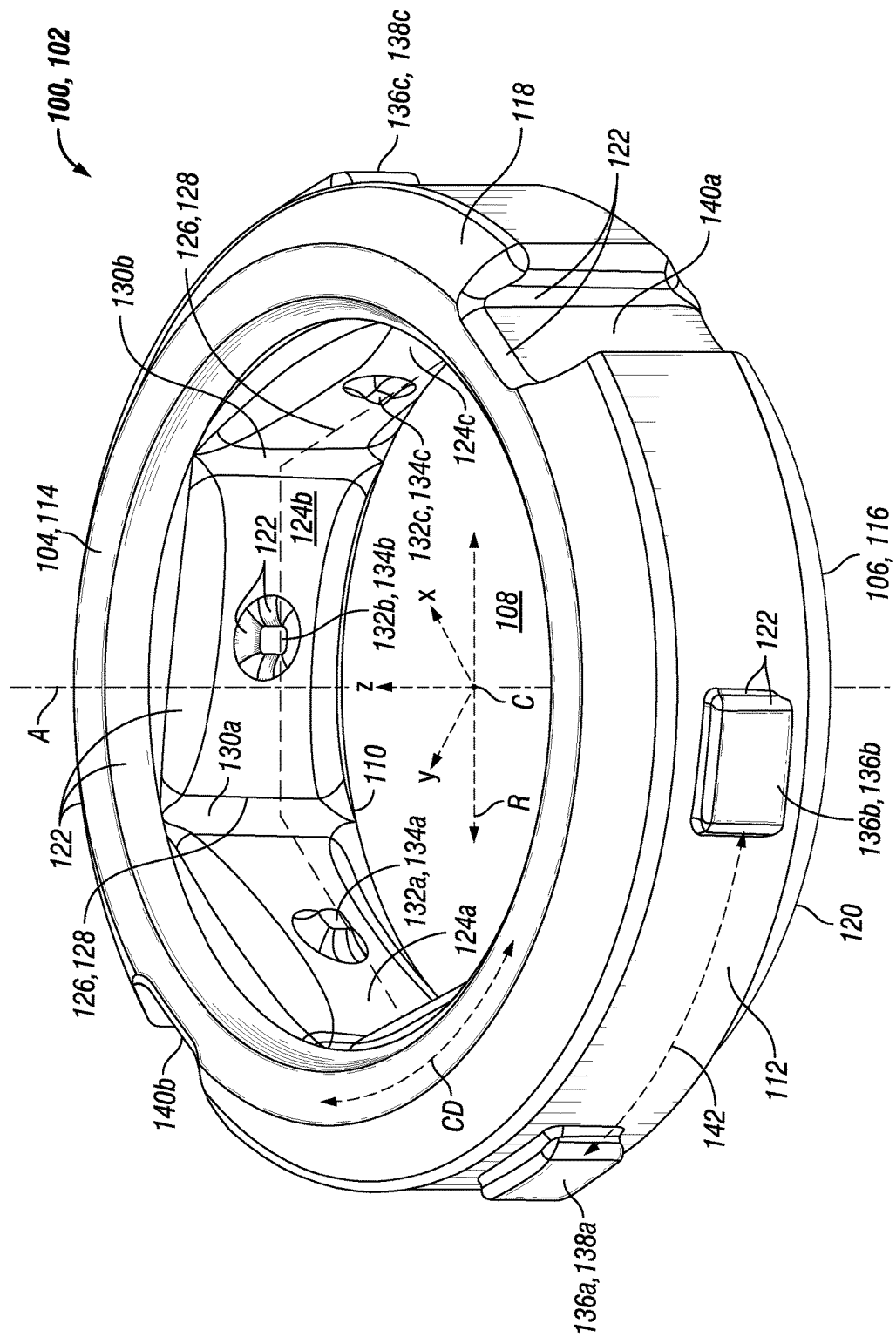
FIG. 1 is a perspective view of a counterbore plug according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or a prime indicator such as 100', 100" etc. It is to be understood that the use of letters or primes immediately after a reference number indicates that these features are similarly shaped and have similar function as is often the case when geometry is mirrored about a plane of symmetry. For ease of explanation in this specification, letters or primes will often not be included herein but may be shown in the drawings to indicate duplications of features discussed within this written specification.

A counterbore plug for attaching components such as a wear member onto a working edge of a work implement for use on construction or mining equipment or the like is provided. The specific configuration of the plug will now be described. First, the configuration of the counterbore plug will be described starting from the radially inner portion of the plug toward the radially outer portion of the plug. Then, the configuration of the counterbore plug will be described starting from the radially outer portion of the plug toward the radially inner portion of the plug. It is to be understood that various modifications to the drawings will be described herein that intend to convey multiple embodiments of a counterbore plug according to the present disclosure.

Looking at FIG. 1, a counterbore plug 100 according to an embodiment of the present disclosure will be described starting from the radially inner portion of the plug 100. The plug comprises a generally cylindrical annular body 102 that defines a cylindrical axis A and a radial direction R. The body further defines a first end 104 and a second end 106 that are disposed along the cylindrical axis A and an aperture 108 that extends from the first end 104 to the second end 106. The body 102 also defines a radially inner annular surface 110 and a radially outer annular surface 112 that are connected to each other by one or more surfaces. As shown in FIG. 1, the body 102 may define substantially flat top and bottom surfaces 114, 116 that are immediately radially adjacent the radially inner annular surface. Top and bottom lead-in surfaces 118, 120 join the top and bottom flat surfaces 114, 116 to the radially outer annular surface 112. For the embodiment shown in FIG. 1, the lead-in surfaces have a chamfered configuration, angled between 30-50 degrees relative to the top surface 114 but other configurations such as curved configurations are possible. Small transition radii 122 are also provided for transitioning from one surface to another.

Focusing on the radially inner portion of the plug 100, it includes a plurality of projections 124 that extend radially from the radially inner annular surface 110 that at least partially define a polygonal perimeter 126. For the embodiment shown in FIG. 1, the plug comprises six projections 124 that extend from the radially inner annular surface 110 that define a hexagonal perimeter 128 that is configured to mate with the perimeter of a hexagonal nut.

In certain embodiments, the plurality of projections 124 may include a generally rectangular profile viewed along the radial direction R normal to the projection 124 that substantially mimics the flat hexagonal face of a nut. The profile may be different in other embodiments. Also, the body 102 may define a clearance slot 130 that extends axially between the first and second ends 104, 106 and that is disposed between the plurality of projections 124. As shown, the axial extremities of the projections 124 and the clearance slot 130 do not reach the top and bottom flat surfaces 114, 116. This may not be the case in other embodiments. This clearance slot 130 may be configured to avoid interference with the relatively sharp corner of a hexagonal nut as will be described in further detail later herein. This feature may be omitted in other embodiments.

At least one of the projections 124 includes a protrusion 132 that extends radially from the projection 124. In most but not all embodiments, every projection 124 includes a protrusion 132 that extends radially from the projection 124. The protrusion 132 may include a generally nipple shaped structure 134. In other embodiments, the protrusion may have another shape or the protrusion may be omitted entirely.

Still referring to FIG. 1, the radial outer portion of the plug 100 may comprise a plurality of pads 136 that extend radially from the radially outer annular surface 112. The radial outer surface 138 of the pads 136 may be cylindrical and may be configured to create interference with the wall that defines the counterbore. In some embodiments, the radially outer pads 136 may be radially aligned with the radially inward projections 124. As a result, the plug may be locally compressed between a hexagonal flat surface of a nut and the cylindrical surface of the counterbore as will be described in further detail later herein. The top and bottom edges of the pads do not reach the top and bottom lead-in surfaces along the cylindrical axis A. This may not be the case in other embodiments.

Also, the radially outer annular surface 112 may define at least one pry slot 140 that is positioned radially aligned with a projection 124 that extends from the radially inner annular surface 110. In some embodiments, the radially outer annular surface 112 may define two such pry slots 140 that are radially diametrically opposite of each other. These slots are configured to allow the insertion of a screw driver or other tool to help remove the plug from a counterbore.

FIG. 1 also depicts a Cartesian coordinate system that is positioned at the centroid C (center of mass) of the plug 100 with the Z axis align with the cylindrical axis A. As shown, the plug is symmetrical about the X-Y and Y-Z planes. However, it is contemplated that other embodiments of the plug 100 may only have one or no plane of symmetry. Embodiments such as that shown in FIG. 1 with multiple planes of symmetry help to fool proof the insertion of the plug into the counterbore without adversely affecting the function of the plug or interfering with assembly or disassembly. Since the plug 100 is shown to be symmetrical about the X-Y plane, all the pads 136, projections 124 and protrusions 132 discussed herein are centered on the X-Y plane along the Z or cylindrical axis A of the plug 100. This may not be the case for other embodiments.

Still referring to FIG. 1, the counterbore plug 100 will now be described starting from its radially outer portion toward its radially inner portion. The counterbore plug 100 may comprise a generally cylindrical annular body 102 that defines a cylindrical axis A and a radial direction R. The body 102 may also define a first end 104 and a second end 106 that are disposed along the cylindrical axis A, an aperture 108 that extends from the first end 104 to the second end 106, a radially inner annular surface 110, and a radially outer annular surface 112. A plurality of pads 136 may also be provided that extend radially from the radially outer annular surface 112. While only three pads are shown in FIG. 1 as one is hidden opposite of pad 136b, it is to be understood that at least four such pads 136 may be provided in some embodiments. Either the radially outer annular surface 112 or the radially inner annular surface 110 may define at least one pry slot 140. As shown in FIG. 1, the radially outer annular surface 112 defines two pry slots 140 that face are disposed in a radially diametrically opposite manner to each other. At least one clearance region 142 may be defined between two adjacent pads along the circumferential direction CD of the plug 100. Also, the top and bottom edges of the pad 136 may be spaced away from the top and bottom lead-in surfaces 118, 120. This may not be the case for other embodiments.

As shown in FIG. 1, the pads 136 and the projections 124 are radially aligned but this may not be the case in other embodiments. Also, a pry slot 140 may be radially aligned with a pad 136 or a protrusion 132 depending on where the pry slot 140 is located, that is to say, whether it is located on the radially outer annular surface 112 or the radially inner annular surface 110. In some embodiments, the aperture 108 may be blind, allowing the blind end of the aperture to cover a nut or bolt. In other embodiments such as that shown in FIG. 1, the aperture 108 may extend completely through the plug 100. Similarly, the pry slots 140 are shown to extend completely axially through the body 102 but they may be blind in other embodiments.

The plug may be injection molded and/or cast from a rubber, polyurethane, Cellasto®, polypropylene, polycarbonate or any other suitable material, including but not limited to, any suitable thermoplastic or elastomer material.

INDUSTRIAL APPLICABILITY

In practice, a plug according to any embodiment discussed herein may be sold, bought, manufactured or otherwise obtained. The plug may be inserted into a counterbore of any apparatus. In one embodiment, the plug is inserted into the counterbore of a wear member, working edge, ground engaging tool, etc. as will now be described. In some cases, the apparatus may be retrofitted with the plug. In others, the apparatus may be sold with the plug already installed.

Figure 2:
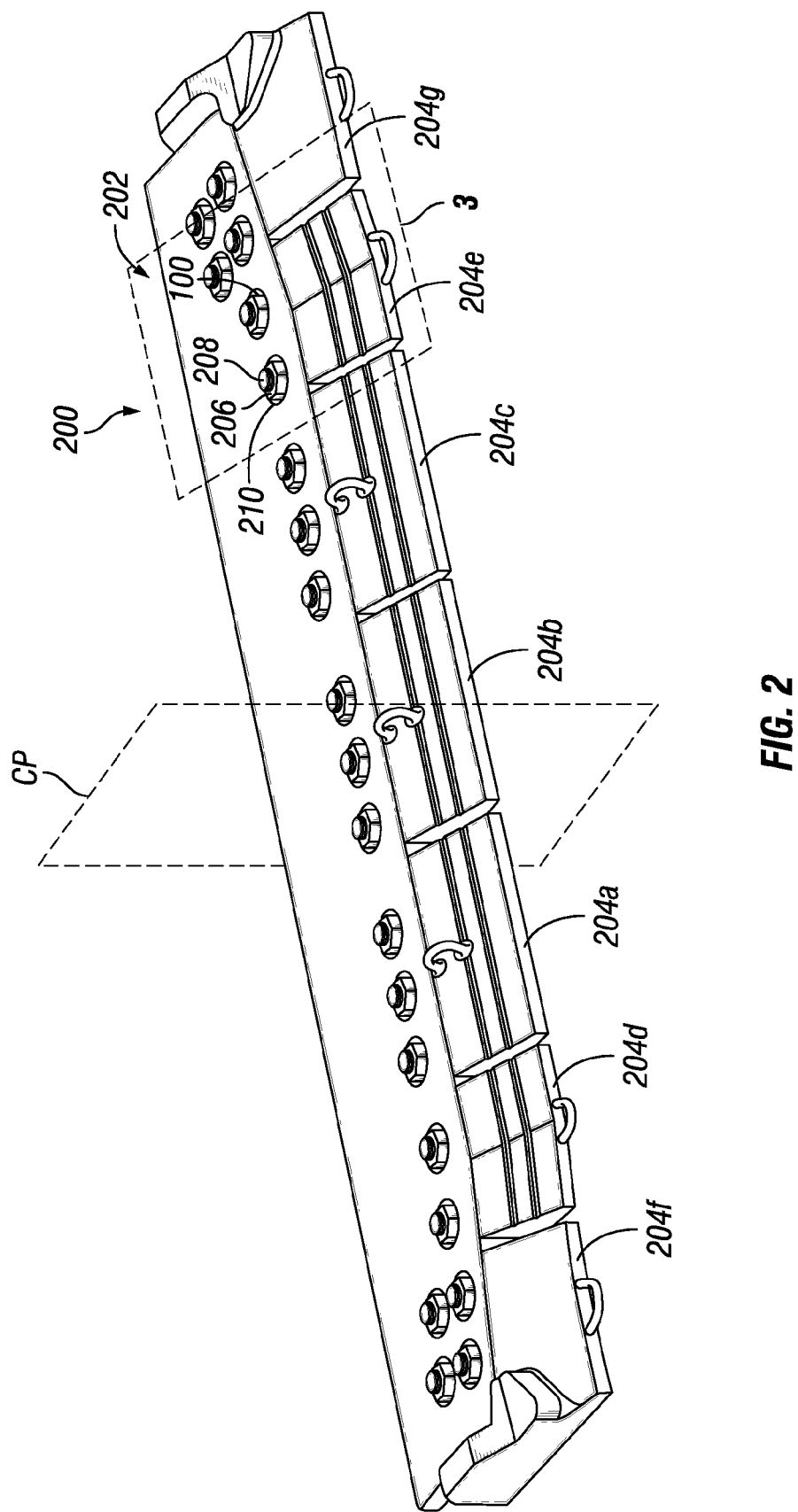
FIG. 2 is perspective view of a front edge of a bucket or the like that uses a bolt on system to attach wear members to the front edge, showing the counterbore plug of FIG. 1 inserted into one of the counterbores.
Figure 3:
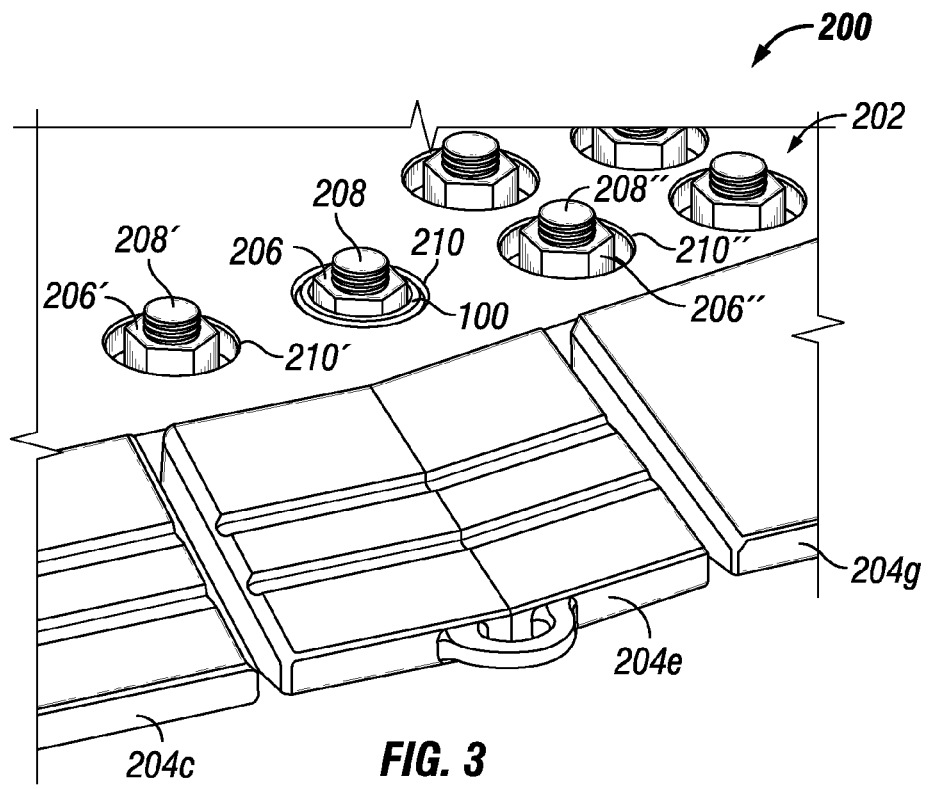
FIG. 3 is an enlarged detail view of FIG. 2 showing more clearly the counterbore plug that is inserted into a counterbore.

Referring now to FIGS. 2 and 3, a work implement 200 in the form of a bucket that includes a working edge 202 in the form of a front edge is partially shown. The bucket, the entirety of which is not shown, may have any suitable known configuration or any other configuration that will be devised in the art. Alternatively, the work implement 200 may be a rake, shears, etc. Similarly, the working edge could be a side edge, etc. For the embodiment specifically illustrated in FIGS. 2 and 3, the front edge may be welded or otherwise attached to the bottom plate of the bucket.

A wear member 204 or ground engaging tool may be attached to the working edge 202 using a nut 206 and bolt 208, wherein the wear member 204, tool or working edge of the work implement 200 defines a counterbore 210 surrounding the nut 206, and a counterbore plug 100 according to any of the embodiments discussed herein may be inserted into the counterbore 210. As shown in FIGS. 2 and 3, a plurality of wear members 204 are attached to the working edge 202. More specifically, three identically configured center wear members 204a, 204b, 204c, two similarly configured intermediate wear members 204d, 204e that are mirrored about the center plane CP of the front edge 202, and two similarly configured corner or end wear members 204f, 204g that are mirrored about the center plane CP are provided. Other configurations are possible. As best seen in FIG. 3, only one plug 100 is shown inserted into a counterbore 210, however, it is to be understood that as many counterbores as needed or desired may be fitted with a plug.

Figure 4:
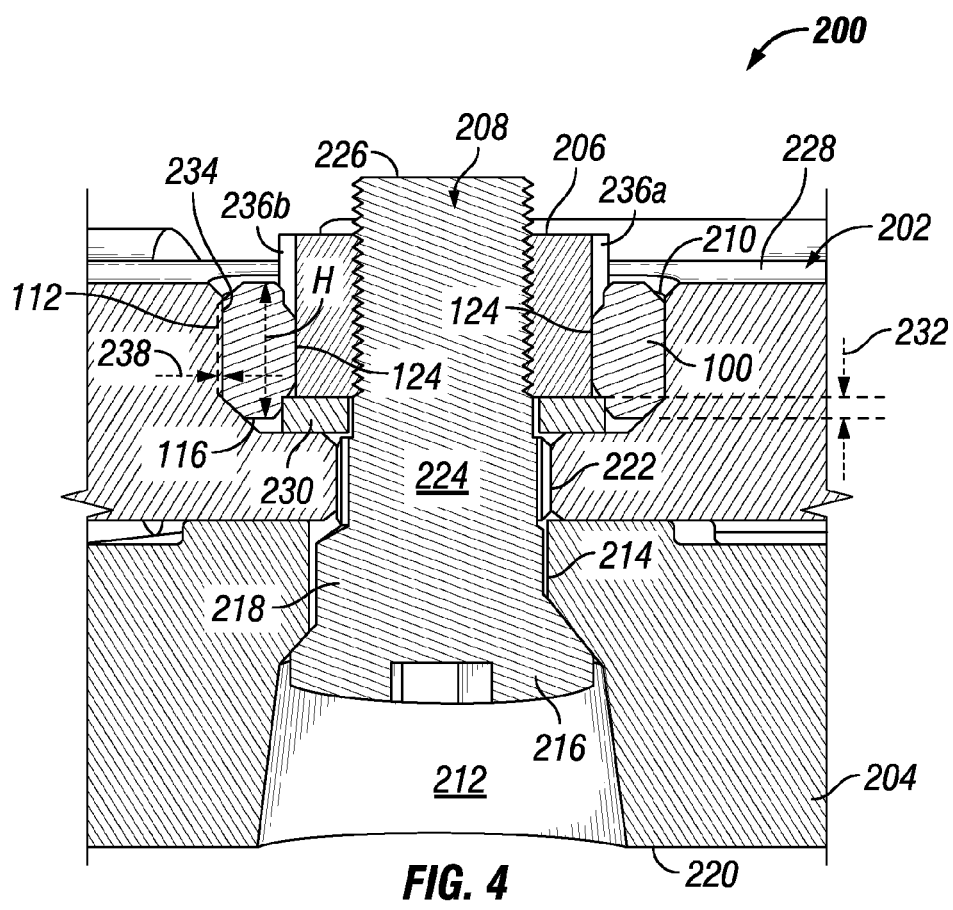
FIG. 4 is a cross-sectional view of the counterbore plug inserted into the counterbore of FIG. 3, taken along lines 4-4 thereof.

Focusing now on FIG. 4, each of the wear members 204 have a head counterbore 212 on their bottom surface 220 that communicates with a bore 214 that receives the portion of the head 216 that has a reduced diameter 218. This bore 214 is roughly aligned with the bore 222 of the front edge 202 for receiving the shaft 224 of the bolt 208. This shaft 224 extends through the nut counterbore 210 and has a nut 206 threaded onto its free end 226. A plug 100 is shown inserted into the nut counterbore 210 as has already been described. As shown, the plug 100 is flush to recessed compared to the top surface 228 of the front edge 202. Hence, the plug 100 is protected from damage. In some embodiments, a washer 230 may be disposed underneath the nut 206. In such a case, the distance 232 from the bottom surface 116 of the plug 100 to the bottom edge of the projection 124 may allow the plug 100 to be inserted into the nut counterbore 210 without creating a significant amount of interference so that the plug 100 may be able to be pressed into the nut counterbore 210 such that it is flush to recessed compared to the top surface 228 of the front edge 202.

In some embodiments such as that shown in FIG. 4, the entire radially outer annular surface 112 may interfere with the wall 234 of the nut counterbore 210. In such a case, the pads on the radially outer annular surface 112 may be omitted. Alternatively, the pads may be present on the radially outer annular surface 112 and create interference 238 with the side wall 234 of the nut counterbore 210 while the radially outer annular surface 112 may still not contact or interfere with the side wall 234 of the nut counterbore 210. Similarly, the projections 124 disposed on the radially inner annular surface 110 of the plug may interfere with the flat hexagonal surfaces 236 of the nut 206. In such a case, the protrusions may be omitted. In yet other embodiments, the protrusions (not shown in FIG. 4) may interfere with the flat hexagonal surfaces 236 of the nut 206. In such a case, the projections may not contact or interfere with the flat hexagonal surfaces 236 of the nut 210.

It is contemplated that the structure shown in FIG. 4 could be completely reversed such that the plug is on the bottom and the head of the bolt is on top. Similarly, the nut counterbore could be located on the bottom member such as the wear member while the head counterbore could be located on the top member such as a working edge. In other embodiments, the top member could be the wear member and the bottom member could be the working edge, etc.

Figure 5:
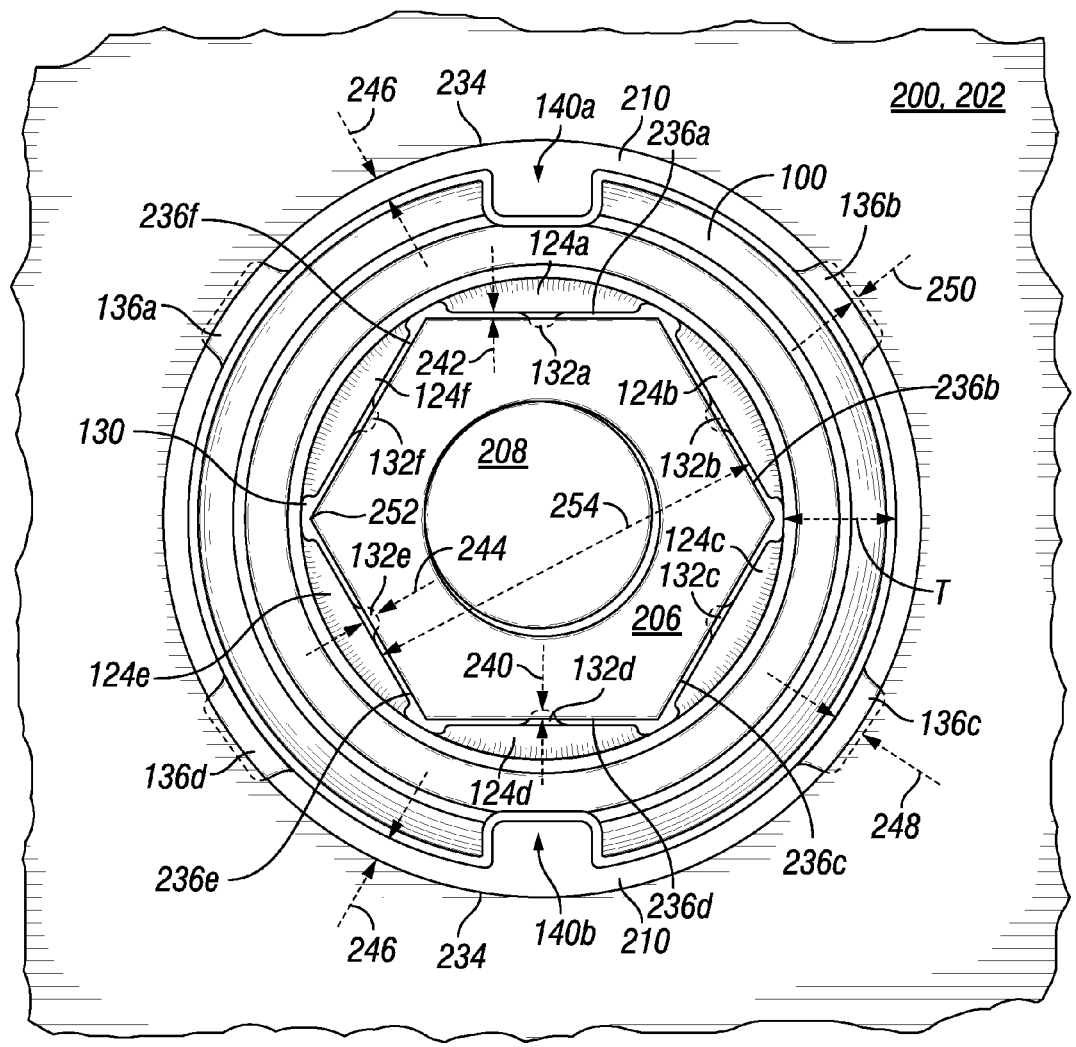
FIG. 5 is a top view of the counterbore plug inserted into the counterbore of FIG. 3, more clearly depicting the mating of the plug with the nut and the wall of the counterbore.

FIG. 5 is a top view of an embodiment of the counterbore plug 100 inserted into the counterbore 210 of FIG. 3, more clearly depict the mating of the plug 100 with the nut 206 and the wall 234 of the counterbore 210. For this embodiment, it can be seen that the protrusions 132 form interference 240 with the flat hexagonal faces 236 of the nut 206. Consequently, a small gap 242 may be present between the nut 206 and the plug 100. This gap 242 may be minimized by altering the various dimensions of the plug 100 such as the radial distance 244 the protrusion 132 extends from the projection 124 of the plug 100. Similarly, there is some slight interference 250 between the pads 136 and the side wall 234 of the nut counterbore 210. As a result, a second small gap 246 may be present between the wall 234 of the nut counterbore 210 and the plug 100. Again, this gap 246 may be minimized by altering the various dimensions of the plug 100 such as the radial distance 248 the pad 136 extends from the radially outer annular surface 112 of the plug 100. The provision of the clearance slots 130 between the projections 124 avoids interference with a corner 252 of the nut 206.

Exemplary dimensions of an embodiment of a plug will now be recited with reference to FIGS. 4 and 5. It is to be understood that these dimensions may be varied as needed or desired. The interference 240 created between the nut 206 and the protrusion 132 may range from 0 to 2 mm and the interference 250 created between the wall 234 of the nut counterbore 210 and the pads 136 may range from 0 to 4 mm. The flat to flat distance 254 between opposing projections 124 may be sized to provide a slight interference between the nut and the plug. For example, an interference of 0.5 mm on a side is contemplated for certain embodiments. The overall height H of the plug 100 may also vary depending on the application. For example, the size of the nut and counterbore to be accommodated may affect the overall height. The circumferential dimension of a pad may range and its height along the cylindrical axis A will also vary depending on the application. The radial depth of the pry slot may range from 0 to 10 mm while the width of the pry slot may range from 0 to 20 mm in various embodiments. The diameter of the nipple structure of the protrusion may vary in various embodiments for use in different applications. The radial thickness T of the annular portion of the plug 100 will also naturally vary depending on the application. In some embodiments, a midrange value of these various dimensions may be employed.

It is further contemplated that the annular portion of the plug in conjunction with the projections may mimic the structure of the socket used to tighten or loosen the nut. As a result, any matter that does infiltrate into the nut counterbore despite the presence of the plug, such as may be attributable to the small gaps between the sidewall of the counterbore and the hexagonal perimeters of the interior of the plug and exterior of the nut, will not impede inserting the socket into the nut counterbore to loosen or tighten the nut.

While most embodiments have been directed to the lip shrouds that are attached to the base edge of a bucket, the principles of the disclosed embodiments and methods may be equally applied to other applications that involve any wear member that may be attached to any working edge of any work implement. Similarly, the configurations, materials, and methods of manufacturing may be altered as needed or desired.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A counterbore plug, the plug comprising:
  a generally cylindrical annular body defining:
    a cylindrical axis and a radial direction;
    a first end and a second end that are disposed along the cylindrical axis;
    an aperture that extends at least partially from the first end to the second end;
  the body including
    a radially inner annular surface;
    a radially outer annular surface; and
    a plurality of projections that extend radially from the radially inner annular surface that at least partially define a polygonal perimeter;
    wherein the plurality of projections include a generally rectangular profile viewed along the radial direction normal to the projections and at least one of the projections includes a protrusion that extends radially from the projection, the protrusion being spaced away from the rectangular profile.

2. The plug of claim 1 wherein the plurality of projections comprises six projections that extend from the radially inner annular surface that define a hexagonal perimeter.

3. The plug of claim 1 wherein every projection includes a protrusion that extends radially from the projection, the protrusion being spaced away from the rectangular profile.

4. The plug of claim 1 wherein the body defines a clearance slot disposed between the plurality of projections.

5. The plug of claim 1 wherein the protrusion includes a generally nipple shaped structure.

6. The plug of claim 1 further comprising a plurality of pads that extend radially from the radially outer annular surface, the pads being spaced away from the first end and the second end of the plug and from each other.

7. The plug of claim 1 wherein the radially outer annular surface defines at least one pry slot that is positioned radially aligned with one of the plurality of projections that extends from the radially inner annular surface.

8. A counterbore plug, the plug comprising:
  a generally cylindrical annular body defining:
    a cylindrical axis and a radial direction;
    a first end and a second end that are disposed along the cylindrical axis;
    an aperture that extends at least partially from the first end to the second end;
  the body including
    a radially inner annular surface;
    a radially outer annular surface; and
    a plurality of pads that extend radially from the radially outer annular surface, the pads being spaced away from the first end and the second end of the plug and from each other.

9. The plug of claim 8 wherein either the radially outer annular surface or the radially inner annular surface defines at least one pry slot.

10. The plug of claim 9 wherein the radially outer annular surface defines two pry slots that face are disposed in a diametrically opposite manner to each other.

11. The plug of claim 8 wherein the plurality of pads include a generally rectangular profile viewed along a radial direction normal to the pads.

12. The plug of claim 8 further comprising a plurality of projections that extend radially from the radially inner annular surface that at least partially define a polygonal perimeter.

13. The plug of claim 12 wherein the plurality of projections comprises six projections that extend from the radially inner annular surface that define a hexagonal perimeter.

14. The plug of claim 13 wherein every projection includes a protrusion that extends radially from the projection and is spaced away from the first end and the second end of the plug.

15. The plug of claim 14 wherein the protrusion includes a generally nipple shaped structure.

16. The plug of claim 12 wherein the pads and the projections are radially aligned.

17. A work tool assembly comprising:
   a work implement that includes a working edge;
   a wear member or ground engaging tool that is attached to the working edge using a nut and bolt, wherein the wear member, work tool or working edge of the work implement defines a counterbore surrounding the nut; and
a counterbore plug according to claim 1 or 10 that is inserted into the counterbore.

* * * * *